(No Model.)
H. J. TELLEFSON & T. GUNDERSEN.
REVOLVING EGG CABINET.
No. 369,753. Patented Sept. 13, 1887.
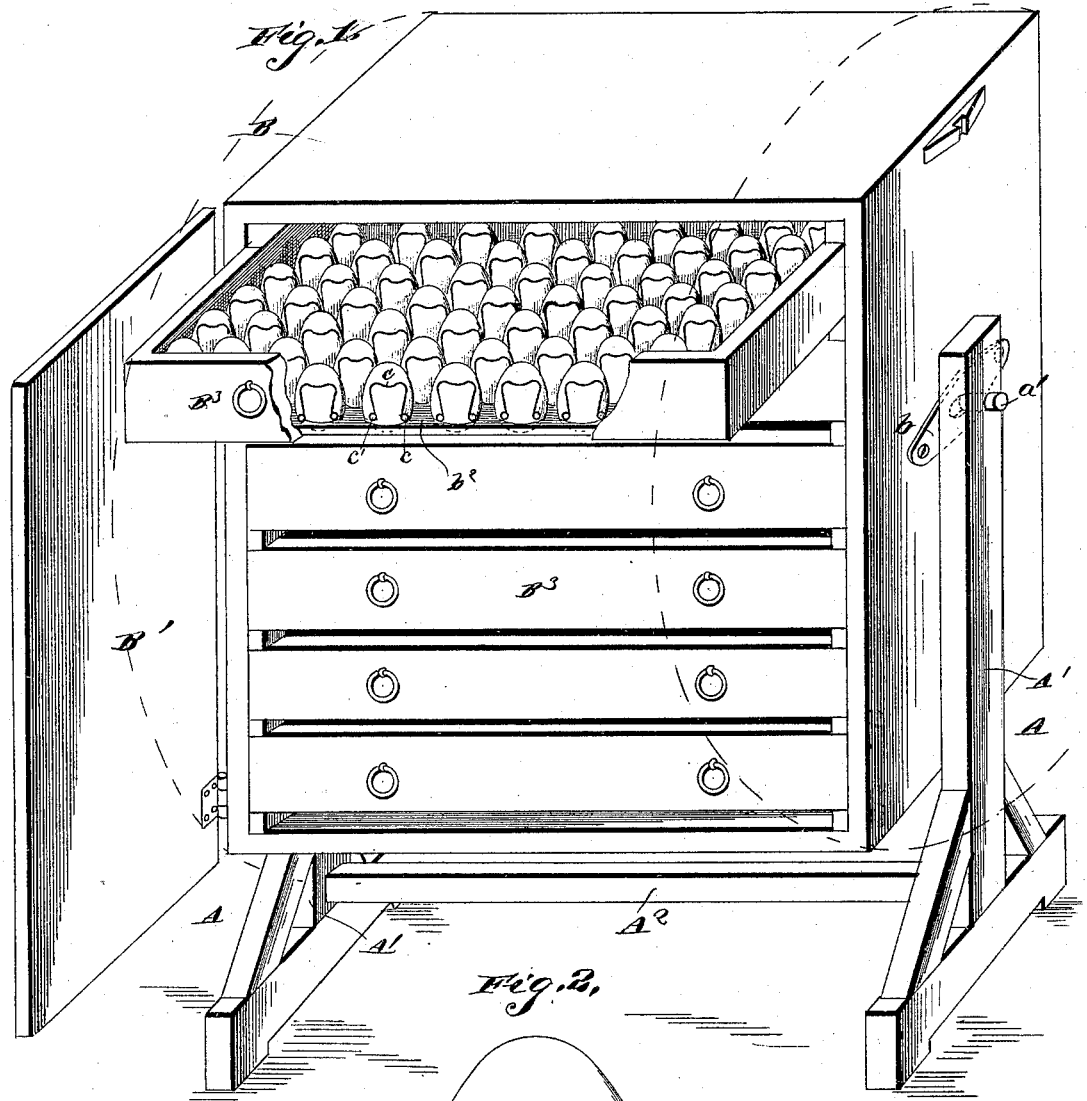
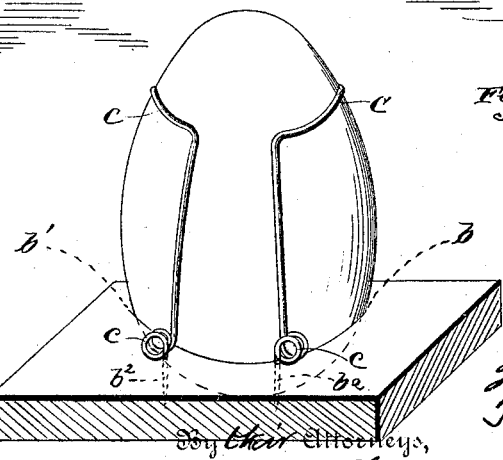
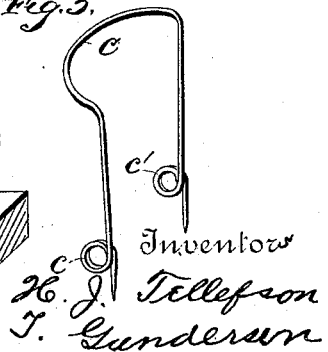

United States Patent Office.

HANS J. TELLEFSON AND TOSTEN GUNDERSEN, OF ROCKDALE, WISCONSIN.

REVOLVING EGG-CABINET.

SPECIFICATION forming part of Letters Patent No. 369,753, dated September 13, 1887.

Application filed April 19, 1887. Serial No. 235,391. (No model.)

*To all whom it may concern:*

Be it known that we, HANS J. TELLEFSON and TOSTEN GUNDERSEN, citizens of the United States, residing at Rockdale, in the county of Dane and State of Wisconsin, have invented a new and useful Improvement in Revolving Egg-Cabinets, of which the following is a specification.

Our invention relates to revolving egg-cabinets for the purpose of preserving eggs; and it consists in the construction and arrangement of the parts of the same, which will be more fully hereinafter described, and pointed out in the claims.

The object of our invention is to provide a revolving egg-cabinet for the preservation of eggs, which is simple and effective in its construction and operation, strong and durable, easily handled and readily understood, positive in its desired ultimate result, and comparatively inexpensive in its manufacture. We attain this object by the construction illustrated in the accompanying drawings, wherein like letters of reference indicate similar parts in the several views, and in which—

Figure 1 is a perspective view of our improved revolving egg cabinet, showing one of the drawers thereof drawn outwardly and the eggs in position therein. Fig. 2 is a detail view in perspective of a portion of the bottom of the drawer, showing the egg held in connection therewith by means of suitable retaining-arms. Fig. 3 is a detail view of one of the spring-arms.

A indicates the base or frame-work, which is constructed with two uprights or standards, A', connected at their lower portions by a cross tie-beam, A². In the upper end of each of the standards A' a fulcrum-pin, a', is mounted and passes therethrough and engages with a slotted plate, b, secured to the side of the cabinet B. This cabinet B is constructed with a series of drawers which are adapted to be drawn outwardly from said cabinet or shoved therein and closed thereby, and when inclosed by the cabinet a door, B', may be closed over the face of the drawers and secured to the cabinet, and thereby retain the drawers in their closed position. The bottom of each of the drawers B² is provided with a series of depressions, b', for the reception of the eggs. These depressions b' are arranged in rows, either in a direct line or in a curvilinear form, as may be desired, and when the eggs shall have been placed therein they will be arranged in rows of the form of the said depressions.

On each side of the depressions b' spring-arms C are mounted, which partially surround the egg and are open at their upper portions and extend down toward the bottom of the drawer in which they are mounted, and are formed with coils c, and the end of each arm thereof continued across the curved form resting on the drawer and formed into a coil, c', similar in form to the coil c, but some distance away therefrom. The other ends or legs of the coils c and c' project inwardly, and are secured in the bottom of the drawers B².

The spring-arms C are drawn open against the coils c and c', the egg is inserted therein with its one end resting in the depressions b', and the said arms are then allowed to gently fall back upon the egg and around the same, as shown in Fig. 2, and thereby retain it in an upright position, or in contact with the body of the drawer, in whatever position the same may be turned. When the eggs shall have been thus arranged within the several drawers, the cabinet-door B' will be closed and suitably secured to the cabinet-frame, when the eggs will be secured within the drawers B², and the drawers B³ secured and inclosed within the cabinet B by means of the door B'.

It is well known that eggs resting in a single unmoved position will more readily spoil and become worthless than when their position is changed. To accomplish this desired result, the cabinet B is trunnioned in connection with the uprights A', as hereinbefore described, and may be revolved entirely around, as indicated by the circular lines *l l*, or be turned upside down and suitably held in that position; or, by means of the slotted plate *b*, may be tilted either in a forward or backward position. Thus it will be seen that any position desired may be readily attained without danger of breakage of the eggs to be turned in the cabinet and at the same time obtain the desired result.

It is obvious that many minor changes in the construction and arrangement of parts may be made and substituted for those herein shown and described without in the least departing from the nature and principle of our invention.

Having described our invention, we claim—

1. In an egg-cabinet, the combination of a supporting-frame having suitable standards, a rotatable cabinet mounted therein and adapted to be revolved thereon, a series of drawers contained by said cabinet, having a series of depressions, $b'$, arranged in alignment, and the independent spring-arms C, arranged on each side of each one of said depressions, substantially as described.

2. The combination, with the drawers $B^3$, having aligned depressions $b'$ formed therein, of the independently-mounted retaining-springs C, arranged on each side of each one of the said depressions and engaging only with the upper portion of each egg, substantially as described.

In testimony that we claim the foregoing as our own we have hereto affixed our signatures in presence of two witnesses.

HANS J. TELLEFSON.
TOSTEN GUNDERSEN.

Witnesses:
  THEO. TELLEFSON,
  J. N. HOLVERSON.